United States Patent [19]

Barrenechea

[11] Patent Number: 4,961,789
[45] Date of Patent: Oct. 9, 1990

[54] PROCEDURES FOR THE PREPARATION AND FABRICATION OF CONCRETE ADDITIVES PRODUCED FROM NATURAL PRODUCTS

[76] Inventor: Luis P. Barrenechea, Aptdo. Correo Carmelitas 55, Caracas, Venezuela

[21] Appl. No.: 272,811

[22] Filed: Nov. 18, 1988

[51] Int. Cl.$^5$ .............................................. C04B 24/10
[52] U.S. Cl. ................................... 106/823; 106/316; 106/210; 106/804
[58] Field of Search ........................ 106/210, 314, 317

[56] References Cited

U.S. PATENT DOCUMENTS 4,810,299  3/1989  Schilling et al. ..................... 106/277

Primary Examiner—William R. Dixon, Jr.
Assistant Examiner—Alan A. Wright
Attorney, Agent, or Firm—Dennison, Meserole, Pollack & Scheiner

[57] ABSTRACT

A process is disclosed for manufacturing water reducing plasticizing and hardening-retarding plasticizing additives for concrete, using sugarcane derivatives that modify the structural characterisitics of the concrete, resulting in improved plasticity and density and altering of the curing time.

12 Claims, No Drawings

PROCEDURES FOR THE PREPARATION AND FABRICATION OF CONCRETE ADDITIVES PRODUCED FROM NATURAL PRODUCTS

BACKGROUND OF THE INVENTION

Field of the Invention

This invention relates to a process or method for the manufacture of additives, to be included in a concrete mixture, from the natural by-products of sugarcane wherein the final concrete mixture is used in the conventional fashion for construction in a variety of applications.

Description of the Prior Art

The construction industry more and more requires concrete mixtures for a variety of different construction applications. For many years, the use of additives for the purpose of specifically improving the richness and excellence of conditions of concrete in almost any kind of construction has been practiced. Generally speaking, depending upon the specific application for which the end concrete product is intended, the additive is a necessary ingredient which gives the resulting mixture certain desired characteristics or which enhances or combines certain conditions as desired for the specific construction project. Additives, in addition to modifying certain structural characteristics, once they have been added to concrete, modify its characteristics and level of resistance to compression. Typically, such additives accelerate or delay its hardening or curing time as well as providing a fluidizing effect and possibly act as an integral water-proofing material.

Several products are known as concrete additives which once added to concrete modify characteristics such as resistance, plasticity, density, hardening or curing time or quantity of air required to be added, depending upon the specific application for which the end concrete product is intended.

Plasticizing additives also known as fluidizing additives are those devoted to fluidize the mixture. They have a physical-mechanical working behavior since they cover cement particles thus modifying their surface tension and reducing the rubbing or frictional interaction among the cement particles and between cement particles and sand grains also contained in the mixture. On the other hand, plasticizers electrostatically charge cement particles and increase dispersion among them in order to avoid the development of cement cores or lumps. This has the effect of increasing the resistance of concrete to stress.

Concrete resistance or strength depends basically on the cement/water ratio and is inversely proportional to such ratio. In this sense, the more cement added the more resistance to stress in cement and strength of the resulting concrete product. Conversely, the more water added, the less resistance to stress in cement is the result and the less strength or resistance to stress the end concrete product demonstrates. Plasticizing additives fluidize the mixture and thus they reduce the amount of water required to achieve a degree of plasticity and based on the inclusion of less water, such additives also remarkably increase the strength or resistance to stress of the concrete mixture.

The plasticizing additives act as a water reducer which softens the mixture and makes it more workable. It replaces a large quantity of water and so, for a given amount of cement, when a portion of the water is replaced by designated plasticizing additives, the resistance of the concrete increases or in other words a given level of resistance or strength can be achieved while using less cement.

Since the cost of the additive is notably lower than that of the cement portion it replaces, one of the advantages of providing additives is the reduction of costs, apart from a higher internal cohesion and a better cohesion with cooperative structural components used in a building such as a truss.

Another important feature is that the use of additives of the type set forth hereinafter in greater detail allows a lower percentage of added air. The additive of the subject invention and its operational characteristics vary at the beginning and end of the hardening or curing period and modifies the time of water/cement reaction by increasing or reducing it. For example, when fresh concrete is carried on a truck, it is convenient to delay the hardening or curing time in order to increase the life of the mixture thereby allowing it to be transported over long distances. In this case, the use of a retarder would be most convenient.

To the contrary, in the case of prefabricated concrete, it would be convenient to reduce the hardening time in order to increase the rotation of forms thus reducing costs. In this case, the use of an accelerator would be more practical and convenient. If we combine the plasticizing additive with a retarder two main advantages are the result. Such advantages include plasticity meaning cement savings (more resistance to stress with the same quantity of cement) and the retarder increases the life of the concrete mixture prior to hardening.

DETAILED DESCRIPTION OF A PREFERRED EMBODIMENT

The present invention is directed to a new procedure or method for the manufacturing of concrete additives from natural products or more specifically, from the natural by-products of sugarcane. The subject additive is thereby used in the manufacture of concrete products, used for typical construction applications and serves as a plasticizing, water-reducing additive which has been synthesized from a by-product of the treatment of molasses called Soluble Molasse Condensate or SMC. This name is collectively applied to the products obtained by condensing by-products resulting from the fermentation of molasses when these latter are treated to obtain alcohols. All by-products obtained as a waste of molasses fermentation are commonly known as vinasses and after condensation and evaporation they are called Soluble Molasse Condensate or, as set forth above, SMC.

This SMC is later treated with stabilizers, blockaders and other elements thereby causing the ph or degree of acidity to be changed. All this results in a water-reducing additive which is obtained through the procedure described below. The SMC is later mixed with a hardening retarder (glucoses, glucoheptonates, etc.) which shall produce a plasticizing retarding additive. Thus, the purpose of the present invention is to provide a new procedure for the manufacture of additives for concrete from natural by-products of sugarcane and which have been divided into completely independent and different steps or stages.

PHASE I—PRELIMINARY MIXTURE

In a mixing container of adequate capacity equalling at least one thousand liters, and substantially five hundred liters of water having a temperature of 35° C. Next calcium terpineate in the quantity of twenty kilograms is added to the water at a slow rate to achieve optimum homogenization. The water and teripineate in the above designated quantities are then mixed with the aid of a vane-type, rotary mixer at a speed of between seven hundred fifty and one thousand revolutions per minute. Care should be taken to submerge the vane mixer within the resulting mixture to a sufficient degree to eliminate or reduce as much as possible the production of foam.

Once the calcium terpineate has been duly diluted in water at the above-mentioned temperature, an additional approximate five hundred liters of water preferably at the same temperature of the already mixed diluted calcium terpineate and the resulting product or mixture obtained is left to settle in a standing environment, without mixing, for approximately thirty minutes.

PHASE II—PRELIMINARY MIXTURE

In a mixing container of proper capacity add five hundred liters of water and subsequently add slowly thereto five hundred kilograms of caustic soda NaOH and mix with a vane-type rotary mixture at substantially seven hundred fifty revolutions per minute until a homogeneous solution is produced. Then add sufficient water thereto to produce one thousand liters of the resulting product.

PREPARATION OF BASE PRODUCT

In this stage, the density of the vinasses concentrate is measured by the use of a densimeter and the calculation of degrees Brix by the use of equivalence tables, as well as the calculation of solid percentage and water measurement of the mix in order to obtain a homogeneous mixture so that after adding the rest of the elements, the final product has a density of 1.18 to 1.20 for a concrete dosage of four fluid ounces per bag of cement.

PREPARATION OF PLASTICIZING WATER-REDUCING ADDITIVE

Based on the need to prepare one thousand liters of the additive which is the subject of the present invention, a mixing container shall be initially filled with the BASE PRODUCT as set forth above, i.e., with the duly homogeneous soluble molasse condensate - SMC obtained through the procedures described above until sufficient quantity exists to substantially cover the vane of the rotary mixer. The mixer must then be immediately put into operation and then added thereto slowly two liters of the preliminary mixture described in Phase I above and subsequently twenty-five liters of the preliminary mixture described in Phase II. Next, add ten liters of formaldehyde solution in water 37% by weight (formol) and fill with the base product, i.e., the soluble molasse concentrate - SMC up to a total quantity or mixed product of one thousand liters. This mixture should then be allowed to settle until the air occluded in the mixture is substantially eliminated. Thereafter, samples of the resulting product should be made to assure the following characteristics of the resulting product: Specific gravity is substantially 1.18 to 1.20 Kg/dm3; ph=8.4 to 9; color is a dark shining brown.

PREPARATION OF THE PLASTICIZING HARDENING-RETARDER ADDITIVE

Based on the need to prepare one thousand liters of the additive which is the subject of this invention, a mixing container shall be initially filled with the Base Product as set forth above of duly homogenized soluble molasse condensate - SMC prepared through the procedure described above until the level of the product within the container substantially covers the vane of the rotary mixer. The mixture is immediately activated into operation and added slowly thereto are two liters of the product obtained by the Preliminary Phase I. Next, add twenty-five liters of the product obtained in the Preliminary Phase II. Next, add ten liters of formaldehyde (formol) and add fifty liters of homogenized sugarcane molasses with a specific weight of 1.3 Kg/dm3 and finally fill the remainder of the one thousand liter capacity container with soluble molasse condensate-SCM up to a total quantity of mixed product of one thousand liters. The mixture should be allowed to stand until the air occluded in the mixture is substantially eliminated and then a sample of the resulting product should be determined to have the following characteristics: Specific weight equals 1.8 to 1.20 Kg/dm$^2$ ph=8.4 to 9; color =a dark shining brown.

What is claimed is:

1. A process for manufacturing a concrete additive comprises the steps of:
   a. forming a first homogenized mixture containing water and calcium terpineate;
   b. forming a second homogenized mixture containing water and sodium hydroxide;
   c. forming a dilution of soluble molasses concentrate in water; and
   d. mixing together said dilution of soluble molasses concentrate with said first homogenized mixture, said second homogenized mixture and a water solution of formaldehyde to form a water reducing and plasticizing additive for concrete,
   the additive comprising about 0.004% by weight calcium terpineate, about 1.25% by weight sodium hydroxide, and about 0.37 by weight formaldehyde,
   the solution of soluble molasses concentrate being formed such that said additive has a density of about 1.18 to 1.20 Kg/dm$^3$.

2. A process according to claim 1, wherein said soluble molasses concentrate contains a hardening retarder for the concrete.

3. A process according to claim 1, wherein said first homogenized mixture is formed by the steps of:
   a. introducing into a mixing container a predetermined quantity of water at about 35° C.;
   b. gradually adding to said predetermined quantity of water a predetermined quantity of calcium terpineate, the weight of ratio of water to terpineate being equal to about 25:1;
   c. homogenizing said mixing of water and calcium terpineate; and
   d. further diluting said homogenized mixture with water at a temperature of about 35° C., until a calcium terpineate concentration of about 2% by weight is attained.

4. A process according to claim 3, wherein said mixture is homogenized utilizing a blade mixer submersed within said mixture and operating at a velocity of about 750 to 1000 r.p.m.

5. A process according to claim 1, wherein said second homogenized mixture is formed by the steps comprising:
   a. introducing into a mixing container a predetermined quantity of water at about 18° C.;

b. gradually adding to said predetermined quantity of water a quantity of sodium hydroxide, wherein the weight ratio of water to sodium hydroxide is about 1:1;

c. homogenizing said mixture of sodium hydroxide and water; and d. adding further water at a temperature of about 18° C. to said homogenized mixture until the volume of said mixture is about twice the volume of water originally added to said container.

6. A process according to claim 5, wherein said mixture is homogenized with a blade mixer submersed in said mixture and operating at a velocity of 750 to 1000 r.p.m.

7. A process according to claim 3, wherein said first homogenized mixture comprises 20 kg of calcium terpineate in 1000 liters of water.

8. A process according to claim 1, wherein said second homogenous mixture comprises 500 kg of sodium hydroxide in 1000 liters of mixture.

9. A process according to claim 8, wherein said additive is formed by the steps comprising:

a. introducing a predetermined quantity of diluted soluble molasses concentrate into a mixing container;

b. homogenizing said soluble molasses concentrate and adding thereto a quantity of said first homogenized mixture such that the volume ratio of the final additive to the first homogenized mixture is equal to about 500:1;

c. adding to said mixture of soluble molasses concentrate and first homogenized mixture under homogenization a quantity of said second homogenized mixture such that the volume ratio of final additive to second homogenized mixture is about 40:1;

d. adding to said mixture of soluble molasses concentrate, first homogenized mixture and second homogenized mixture under homogenization a quantity of formaldehyde solution in water 37% by weight, such that the volume ratio of final additive to formaldehyde solution is about 100:1;

e. subsequently adding further quantity of soluble molasses concentrate sufficient to achieve a predetermined final volume of additive and continuing homogenization; and f. allowing the resulting additive to rest for at least 30 minutes.

10. A process according to claim 9, wherein the predetermined final volume of additive is 1000 liters.

11. A process according to claim 9, additionally comprising the step of adding to said mixture of soluble molasses concentrate, first homogenized mixture, second homogenized mixture and formaldehyde solution, a quantity of homogenized sugarcane molasses with a specific gravity of 1.3 kg/dm$^3$, the volume ratio of final additive to homogenized sugarcane molasses being about 20:1.

12. A process according to claim 1, wherein the pH of the additive is in the range of 8.4–9.0.

* * * * *